US005169714A

United States Patent [19]

[11] Patent Number: 5,169,714

Kondo et al.

[45] Date of Patent: Dec. 8, 1992

[54] HEAT-SHRINKABLE POLYPROPYLENE FILM WITH IMPROVED PRINTABILITY

[75] Inventors: Kazuo Kondo; Nobuya Ishiguro, both of Marugame; Toyoki Wano, Zentsuuji; Teruo Tada, Marugame; Teruaki Yoshida, Ichihara, all of Japan

[73] Assignees: Okura Industrial Co., Ltd.; Sumitomo Chemical Company, Ltd., both of Japan

[21] Appl. No.: 686,145

[22] Filed: Apr. 16, 1991

[30] Foreign Application Priority Data

Apr. 27, 1990 [JP] Japan ................................ 2-111949

[51] Int. Cl.[5] ......................... B32B 27/32; C08K 5/10

[52] U.S. Cl. .................................... 428/331; 428/349; 428/447; 428/448; 428/516; 428/910; 524/310

[58] Field of Search .............. 428/516, 349, 447, 448, 428/910, 331

[56] References Cited

U.S. PATENT DOCUMENTS

| | | | |
|---|---|---|---|
| 4,439,478 | 3/1984 | Ferguson et al. | 428/516 X |
| 4,725,466 | 2/1988 | Crass et al. | 428/516 X |
| 4,966,953 | 10/1990 | Kawakami et al. | 428/216 |

FOREIGN PATENT DOCUMENTS

| | | |
|---|---|---|
| 58-146064 | 8/1983 | Japan . |
| 2-45366 | 2/1990 | Japan . |

*Primary Examiner*—P. C. Sluby
*Attorney, Agent, or Firm*—Lorusso & Loud

[57] ABSTRACT

A heat-shrinkable polypropylene film adapted to be printed with, particularly, a flexographic ink is disclosed, which comprises a single layer heat-shrinkable film of a polypropylene resin composition containing spherical silicone resin fine particles of 0.2 to 5 microns in average particle size in a content of 0.1 to 0.7% by weight or a multi-layer heat-shrinkable film wherein at least one of the surface layers is such a polypropylene resin composition, with at least one surface of the single layer film or one surface of the surface layer of the multi-layer film having been subjected to corona discharge treatment to such degree that wettability index of the treated surface becomes 36 to 42 dyn/cm.

4 Claims, No Drawings

HEAT-SHRINKABLE POLYPROPYLENE FILM WITH IMPROVED PRINTABILITY

BACKGROUND OF THE INVENTION

This invention relates to a heat-shrinkable polypropylene film adapted to be printed. More particularly, it relates to a heat-shririnkable film adapted to be printed for the purpose of, for example, obtaining a display effect for commercial packaging. The heat-shrinkable film of the present invention is particularly adapted to be printed with a flexographic ink having a poor adhesion to polypropylene resins.

Single layer heat-shrinkable films comprising a polypropylene resin or multiple films wherein at least one surface layer comprises a polypropylene film are in common use as heat-shrinkable packaging films. In addition, printed heat-shrinkable films have been used for increasing the display effect of packaged products. In printing these polypropylene heat-shrinkable films, a certain surface treatment is necessary before printing the films for improving adhesion between an ink and the film surface. As such surface treatment, corona discharge treatment has popularly been employed due to its ease. Such surface treatment has been inevitable in the case of printing by a flexographic ink.

However, conventional polypropylene heat-shrinkable films are wound so tight at ambient temperatures due to the shrinking properties of the films themselves (hereinafter referred to as spontaneous shrinking) that films stick to each other to cause blocking. This blocking tendency is particularly serious in the case of storing for a long time at elevated temperatures. In the printing process, the blocking causes change in film tension, resulting in shear in pitch of printed patterns, film breakage or, in an extreme case, film rupture.

In order to solve this blocking problem, it has been proposed to incorporate an amount of an anti-blocking agent composed of silica inorganic powder in the polypropylene heat-shrinkable films. This technique, however, has failed to provide favorable heat-shrinkable packaging films since a necessary amount of such anti-blocking agent for preventing the blocking in turn seriously decreases transparency or sealing properties of the film.

In another technique, a gravure ink having a somewhat better adhesion to polypropylene resins than the flexographic ink has been employed in order to print the film without previous corona discharge treatment. The thus printed films, however, have often suffered delamination of the printed ink when used under severe conditions. In addition, gravure printing process using the gravure ink requires an expensive printing plate, and hence it is not suited for small lot printing from an economic point of view.

Additionally, flexographic printing using the flexographic ink is suited for small lot printing since it requires only an inexpensive printing plate. As has been set forth hereinbefore, however, the flexographic ink has such a poor adhesion to the film that it fails to provide satisfactory printed films.

SUMMARY OF THE INVENTION

It is an object of the present invention to prevent film-to-film blocking of rolled polypropylene heat-shrinkable film even after being subjected to corona discharge treatment, without spoiling transparency and sealing properties of the heat-shrinkable film.

Another object of the present invention is to permit printing of a polypropylene heat-shrinkable film with a flexographic ink.

These objects can be attained by the heat-shrinkable polypropylene film of the following construction which has been subjected to the corona discharge treatment to be described below. That is, the heat-shrinkable polypropylene film of the present invention comprises a single layer heat-shrinkable film comprising a polypropylene resin composition containing spherical silicone resin fine particles of 0.2 to 5 microns in average particle size in a content of 0.1–0.7% by weight or a multi-layer heat-shrinkable film wherein at least one of the surface layers comprises said polypropylene resin composition, with at least one surface of the single layer film or one surface of the surface layer of the multi-layer film having been subjected to corona discharge treatment to such degree that the wettability index of the treated surface becomes 36 to 42 dyn/cm.

The inventors have found that silicone resin fine particles are antiblocking agents capable of solving the problems described hereinbefore.

Additionally, use of silicone resin fine particles as antiblocking agent has already been described in Japanese unexamined patent publication Nos. 62-215646, 62-233248, 62-233248, and 1-135840. These publications, however, disclose neither use of the silicone resin fine particles in heat-shrinkable films nor the fact that heat-shrinkable films containing the particles, which have been subjected to corona discharge treatment, do not suffer film-to-film blocking upon being rolled.

Other objects, features and advantages of the present invention will become apparent from the detailed description of the preferred embodiments of the invention to follow.

DETAILED DESCRIPTION OF THE PREFERRED EMBODIMENTS OF THE INVENTION

Examples of the heat-shrinkable polypropylene film of the present invention adapted to be printed include a single layer film comprising a polypropylene resin and a multi-layer film which comprises a substrate layer and layers laminated on at least one side of said substrate layer wherein at least the surface layer comprises a polypropylene resin. Examples of the latter multi-layer film include films composed of two or more layers wherein the two outermost layers comprise the same or different polypropylene resins, and films composed of two or more layers wherein one of the outermost layer comprises a polypropylene resin and the other outermost layer comprises a resin other than the polypropylene resin. More specifically, suitable multilayer films include films having two layers wherein the respective layers comprise different polypropylene resins, films having three layers wherein the two outermost layers comprise the same or different polypropylene resins and the core layer comprises a resin other than the polypropylene resins, films having three layers wherein one outermost layer comprises the polypropylene resin, and the other outermost layer and the core layer comprise a resin other than the polypropylene resin, and films having five layers wherein an adhesive resin layer or a layer of regenerated resin from non-conforming products produced upon production of articles intervenes between the outermost layer and the core layer of the above-described three-layer film.

The polypropylene resins to be used for these films, include polypropylene copolymers and terpolymers prepared by copolymerization of ethylene, butene, and the like as well as polypropylene homopolymers.

The spherical silicone resin fine particles to be added to the polypropylene resins are particles of 0.2 to 5 microns in average particle size having a network structure wherein siloxane bonds extend three-dimensionally. If the average particle size is less than 0.2 micron, the result is less lubricating than is necessary for heat-shrinkable packaging film and, in addition, corona discharge-treated, rolled film is liable to exhibit blocking. On the other hand, if the average particle size exceeds 5 microns, there result films with a deteriorated transparency which are, therefore, unsuitable as heat-shrinkable packaging films.

Additionally, the spherical silicone fine particles to be used in the present invention are preferably particles with a high sphericity and which are not porous. That is, the particles are silicone resin fine particles with a sphericity of 1.0 to 1.2 and a specific surface area of up to 120 $m^2/g$. The term "sphericity" as used herein means the ratio of A/B wherein A is a longitudinal diamter of the spherical particle measured under an electron microscope, and B a transvers diameter.

The silicone resin fine particles must be added to the polypropylene resin in the amount of 0.1–0.7% by weight. If the content is less than 0.1% by weight, it becomes difficult to obtain the lubricating necessary for heat-shrinkable packaging films and, in addition, corona discharge-treated, rolled film will exhibit film-to-film blocking due to spontaneous shrinking. On the other hand, if more than 0.7% by weight, the result will be films with insufficient transparency and insufficient sealing properties which are, therefore, unsuitable as heat-shrinkable packaging films.

The polypropylene resin composition containing such silicone resin fine particles is used for forming at least one surface of the aforesaid polypropylene heat-shrinkable films of the present invention.

To the above-described polypropylene resin may further be added conventional popular lubricants such as oleic amide, erucic amide, ethylene-bis stearic amide, etc. for the purpose of obtaining lubricating properties different from that obtained by the anti-blocking agent of the present invention.

Then one surface of the side of the polypropylene heat-shrinkable film containing the silicone resin fine particles is subjected to corona discharge treatment to such degree that the wettability index of the treated surface becomes within the range of 36 to 42 dyn/cm. The heat-shrinkable polypropylene film with a wettability within this range does not suffer film-to-film blocking even after being stored for a long time, and has an excellent adhesion to an ink, thus providing a good print. In particular, the heat-shrinkable film permits printing with a flexographic ink. On the other hand, if the wettability index is less than 36 dyn/cm, there results no improvement of adhesion to an ink. Particularly, printing such film with a flexographic ink is impossible. If the wettability index exceeds 42 dyn/cm, the corona discharge treatment of such film requires a prolonged time and, in addition, the film exhibits heat shrinkage upon the treatment, resulting in a deteriorated smoothness of the surface thereof.

The corona discharge treatment is to be conducted only for one surface of the film by one treating procedure, and not for both surfaces at the same time. If both surfaces of the film are subjected to the corona discharge treatment at the same time, rolled films can exhibit blocking even when other conditions are satisfied.

Additionally, the corona discharge treatment may be conducted in the same manner as is conventionally employed for the treatment of plastic film surfaces.

In the present invention, wettability index, transparency, adhesion of ink to film, sealing properties, and blocking properties are evaluated as follows:

Wettability index . . . measured according to JIS-K-6768;

Transparency . . . evaluated in terms of haze measured according to ASTM-D-1003;

Adhesion . . . evaluated according to peeling test using an adhesive tape made of cellophane as follows:

A pressure-sensitive adhesive tape (1 cm×1 cm) is applied onto an ink-bearing surface of the specimen. The adhesive tape is then peeled off with a drawing angle of 180° or less and with a relatively slow drawing speed for the first 5 cm length thereof and with a relatively fast drawing speed for the second 5 cm length. The amount of the ink transferred from the specimen to the adhesive tape and the degree of damage of the ink pattern remaining on the specimen are observed for evaluation of the adhesion.

Sealing properties . . . evaluated by subjecting a 1-cm wide specimen, which has been fused by means of an impulse sealing machine, to tensile test using an autograph (AG-5000A, manufactured by Shimazu Seisakusho Ltd.)

Blocking value . . . measured as follows:

Two 50×100 mm specimens are superposed one over the other such that their corona discharge-treated surfaces or non-treated surfaces are in contact with each other (contact area: 50×50 mm) and that their longitudinal axes are coaxially aligned. Then, the specimens were kept in a 40° C. drier for 24 hours with a load of 10 kg being applied to the contact area. Thereafter, the specimens are taken out of the drier and are drawn at the respective ends not in a superposed state using an autograph to measure the maximum tensile load which represents a blocking value.

There results the following distinct difference between the case in which an anti-blocking agent comprising the spherical silicone resin fine particles is added to the corona discharge-treated surface of a heat-shrinkable polypropylene film and the case in which a conventional inorganic anti-blocking agent is added thereto. Namely, if the two films show about the same blocking properties before the corona-discharge treatment, the former shows less increased blocking than the latter after being subjected to the corona discharge treatment, though both show increased blocking.

This phenomenon clearly serves to give the polypropylene heat-shrinkable film properties useful as film to be printed. That is, since the corona discharge-treated and rolled films do not show blocking due to the spontaneous shrinkage thereof, the films are smoothly unrolled upon being printed, thus causing no change in film tension. Therefore, there is no pitch shear of printed pattern, no film breakage, and no film cut-off.

In addition, corona discharge treatment of the heat-shrinkable polypropylene film of the present invention enables one to print it with a flexographic ink which has been believed to possess only a poor adhesion to polypropylene resins.

The present invention is now described in more detail by reference to the following Examples and Comparative Examples.

EXAMPLE 1

Spherical silicone resin fine particles of 2 microns in particle size, about 1 in sphericity, and 30 $m^2/g$ in specific surface area and a lubricant of erucic amide were added to an ethylene-propylene copolymer having a 138° C. melting point in amounts of 0.2% by weight and 0.5% by weight, respectively. The resulting composition was extruded into a non-stretched tube, then this non-stretched tube was subjected to simultaneous biaxial stretching according to the inflation biaxial stretching method to obtain a 15 μm thick polypropylene heat-shrinkable film. One side of this heat-shrinkable film was subjected to a corona discharging surface treatment under the conditions of 1.5 kw in output and 100 m/min in treating rate by means of a corona discharge-treating machine of 1200 mm in effective width made by Vetaphone Co., Ltd. Thus, there was obtained a heat-shrinkable polypropylene film of the present invention in a rolled form having a wettability index of 40 dyn/cm.

The thus-obtained heat-shrinkable polypropylene film adapted to be printed was left for one week at a room temperature of 30° C., and then subjected to flexographic printing using a flexographic ink. As a result, the rolled film was found to show no blocking, and was smoothly unrolled, causing no change in film tension upon printing. Therefore, no change in pitch of printed pattern arose, and printing was conducted with ease. The printed ink was so strongly adhered to the film surface that no peeling was observed in the peeling test using a cellophane tape.

Additionally, the blocking value of the film was 400 g/25 $cm^2$ before the corona discharge treatment, and 800 g/25 $cm^2$ after the treatment.

Further, the haze of the film was as good as 2.5 before and after the corona discharge treatment. No problems were noted with respect to sealing properties.

EXAMPLE 2

Spherical silicone resin fine particles of 0.5 micron in particle size, about 1 in sphericity, and 70 $m^2/g$ in specific surface area and a lubricant of erucic amide were added to an ethylene-propylene copolymer having a 138° C. melting point in amounts of 0.3% by weight and 0.05% by weight, respectively. A three-layered, non-stretched tube having the structure wherein the inner layer was composed of the above-described resin composition, the outer layer was composed of the same resin as that for the inner resin except for omitting the spherical silicone resin fine particles, and the core (intermediate) layer was composed of a linear low-density polyethylene resin of 0.900 g/$cm^3$ in density and 67° C. in Vicat softening point was extruded, then this non-stretched tube was subjected to simultaneous biaxial stretching according to the inflation biaxial stretching method to obtain a 20 μm thick polypropylene heat-shrinkable film of 1:3:1 in thickness ratio of the layers constituting the film.

This heat-shrinkable film was subjected to the surface treatment for treating the surface on the side containing the spherical silicone resin fine particles under the same conditions as employed in Example 1. Thus, there was obtained a heat-shrinkable polypropylene film of the present invention in a rolled form having a wettability index of 40 dyn/cm.

The thus-obtained heat-shrinkable polypropylene film adapted to be printed was left for one week at a room temperature of 30° C., and then subjected to flexographic printing on the surface-treated side using a flexographic ink in the same manner as in Example 1. As a result, the rolled film was found to show no blocking and to have good printability. The printed ink was so strongly adhered to the film surface that no peeling was observed in the peeling test using a cellophane tape.

Additionally, the blocking value of the film was 450 g/25 $cm^2$ before the corona discharge treatment, and 850 g/25 $cm^2$ after the treatment.

Further, the haze of the film was as good as 2.8 before and after the corona discharge treatment. No problems were noted with respect to sealing properties.

EXAMPLE 3

A rolled heat-shrinkable polypropylene film adapted to be printed was prepared in the same manner as in Example 2 except for providing two interlayers—one between the inner layer and the core layer, and the other between the outer layer and the core layer—using a regenerated product made of non-conforming products by-produced in the present invention, with the layer thickness ratio being 20:15:30:15:20.

This heat-shrinkable film was subjected to the surface treatment in the same manner as in Example 2.

The thus-obtained polypropylene heat-shrinkable film was found to show no blocking and to have good printability. The printed ink was so strongly adhered to the film surface that no peeling was observed in the peeling test using a cellophane tape.

Additionally, this film showed about the same blocking properties between before and after the corona discharge treatment.

COMPARATIVE EXAMPLE 1

A rolled heat-shrinkable polypropylene film adapted to be printed was prepared in the same manner as in Example 1 except for using conventional porous fine particles composed of a silica inorganic material in a content of 1% by weight in place of the spherical silicone resin fine particles used in Example 1.

The thus-obtained heat-shrinkable film showed blocking properties before the corona discharge treatment of 450 g/25 $cm^2$ which is about the same as in Examples 1 and 2. However, the film showed, after the treatment, seriously increased blocking which high as 1,300 g/25 $cm^2$, as is greatly different from the film obtained in Example 1. In addition, when rolled, this film showed such serious blocking that unrolling of the rolled film was not conducted smoothly.

As to transparency, this film showed a transparency of as poor as 7.8 both before and after the corona discharge treatment, thus being unable to be used for packaging by heat shrinking thereof.

The heat-shrinkable polypropylene film of the present invention adapted to be printed keeps the transparency of the polypropylene resin, and posseses good sealing properties, thus being the most suitable for packaging by heat-shrinking technique.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A heat-shrinkable film which comprises:

a single heat-shrinkable layer of a polypropylene resin composition containing 0.1–0.7% by weight of spherical silicone resin particles having an average particle size of 0.2 to 5 μm, at least one side of the surface of the single layer having been subjected to a corona discharge treatment so that the wettability index of the treated surface ranges from 36–42 dyn/cm.

2. A heat-shrinkable film which comprises:

a heat-shrinkable substrate layer formed of polypropylene and a heat-shrinkable layer of a polypropylene resin composition laminated on at least one side of said substrate layer, said composition containing 0.1–0.7% by weight of spherical silicone resin particles having an average particle size of 0.2–5 μm, at least one side of the surface of the laminated layer having been subjected to a corona discharge treatment so that the wettability index of the treated surface ranges from 36–42 dyn/cm.

3. The heat-shrinkable film of claim 1, wherein the polypropylene is selected from the group consisting of:

polypropylene homopolymer,
ethylene-propylene copolymer,
propylene-butene copolymer, and
ethylene-butene-propylene copolymer.

4. The heat-shrinkable film of claim 2, wherein the polypropylene is selected from the group consisting of:

polypropylene homopolymer,
ethylene-propylene copolymer,
propylene-butene copolymer, and
ethylene-butene-propylene copolymer.

* * * * *

UNITED STATES PATENT AND TRADEMARK OFFICE

CERTIFICATE OF CORRECTION

PATENT NO. : 5,169,714

DATED : December 8, 1992

INVENTOR(S) : KONDO et al

It is certified that error appears in the above-identified patent and that said Letters Patent is hereby corrected as shown below:

Col. 2, line 29, delete "62-233248" and insert --62-232448--; and line 48, delete "the" insert --one--.

Signed and Sealed this

Twenty-second Day of February, 1994

Attest:

BRUCE LEHMAN

Attesting Officer

Commissioner of Patents and Trademarks